Dec. 17, 1968     M. TOMASOVICH     3,416,680
BIN TURNING ATTACHMENT FOR FORK LIFT VEHICLE
Filed March 13, 1967     4 Sheets-Sheet 1
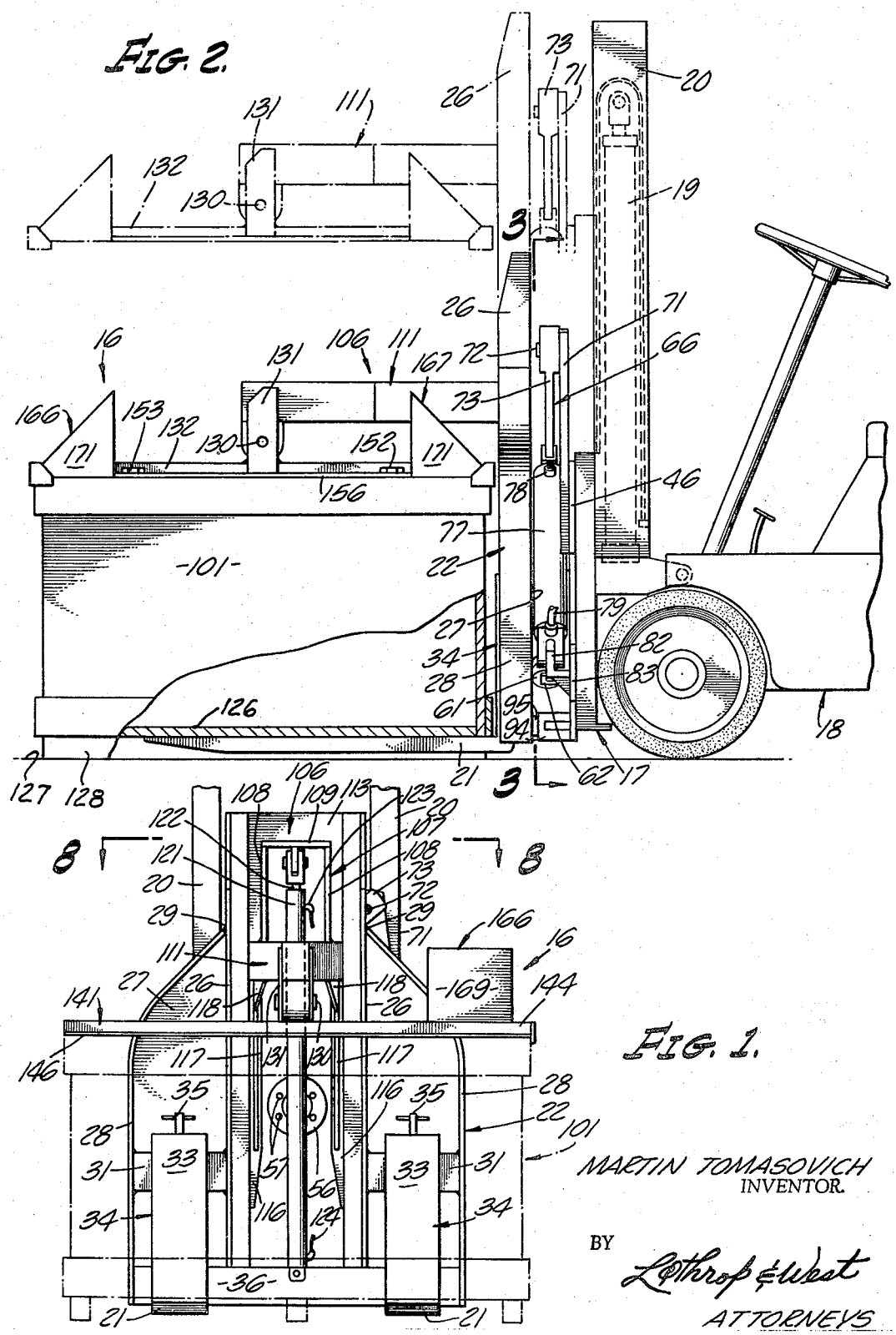
MARTIN TOMASOVICH
INVENTOR.
BY Lothrop & West
ATTORNEYS Dec. 17, 1968    M. TOMASOVICH    3,416,680
BIN TURNING ATTACHMENT FOR FORK LIFT VEHICLE
Filed March 13, 1967    4 Sheets-Sheet 2
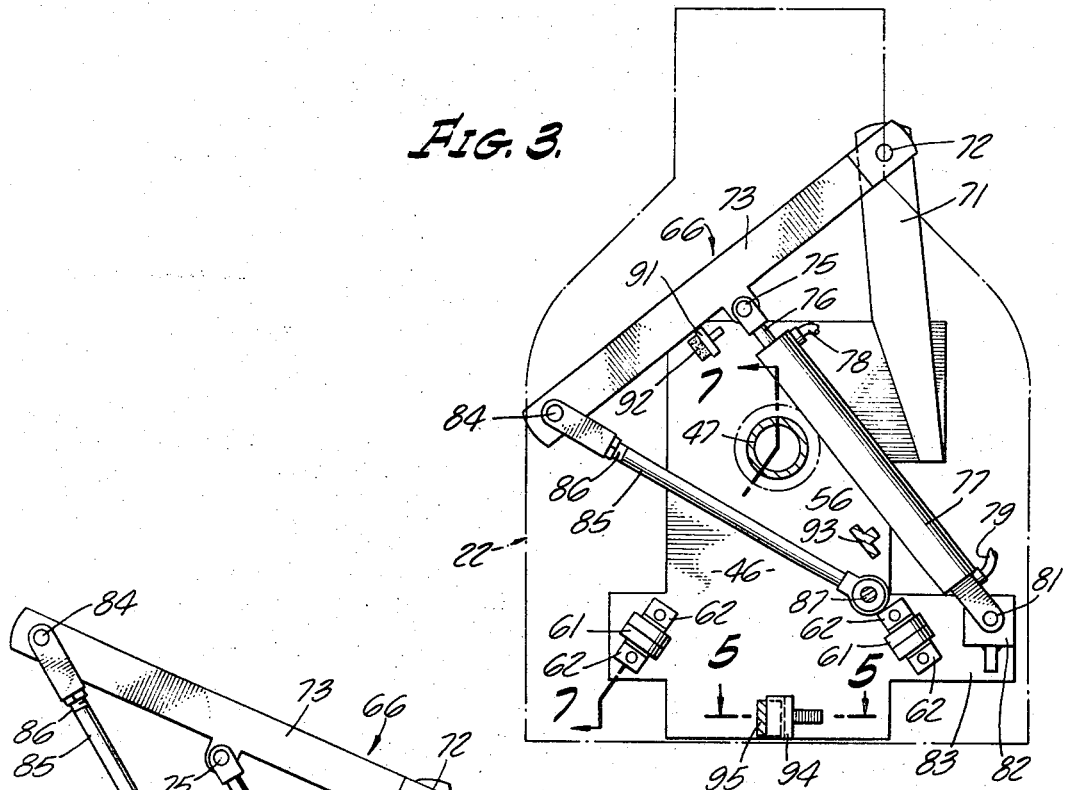
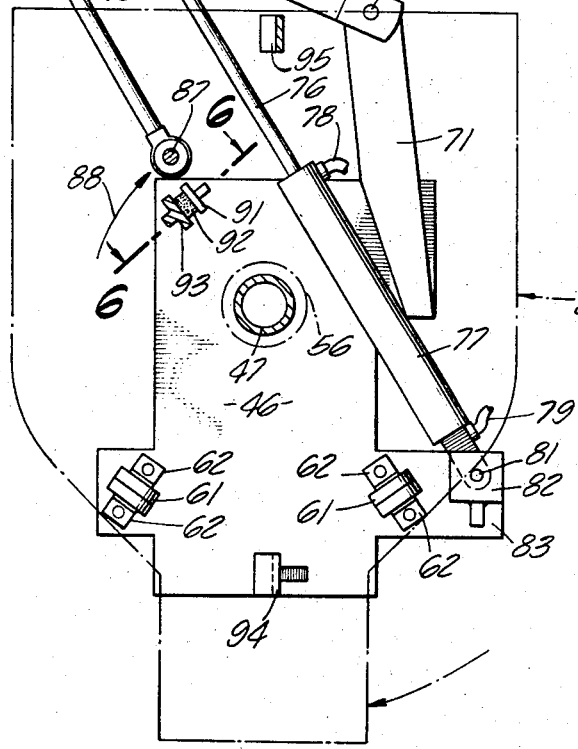
MARTIN TOMASOVICH
INVENTOR.
BY
Lathrop & West
ATTORNEYS Dec. 17, 1968 M. TOMASOVICH 3,416,680
BIN TURNING ATTACHMENT FOR FORK LIFT VEHICLE
Filed March 13, 1967 4 Sheets-Sheet 3
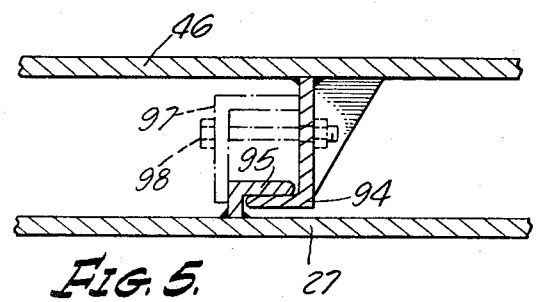
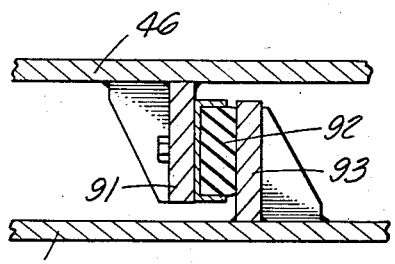
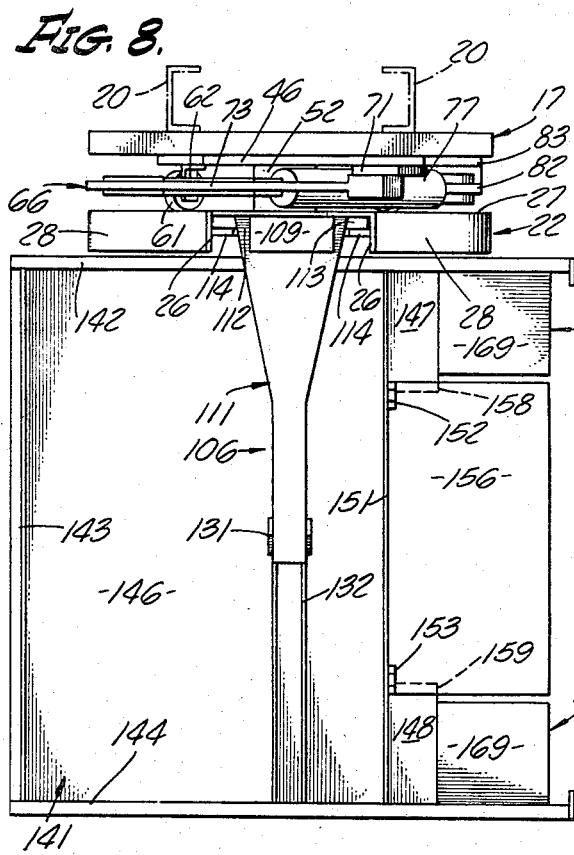
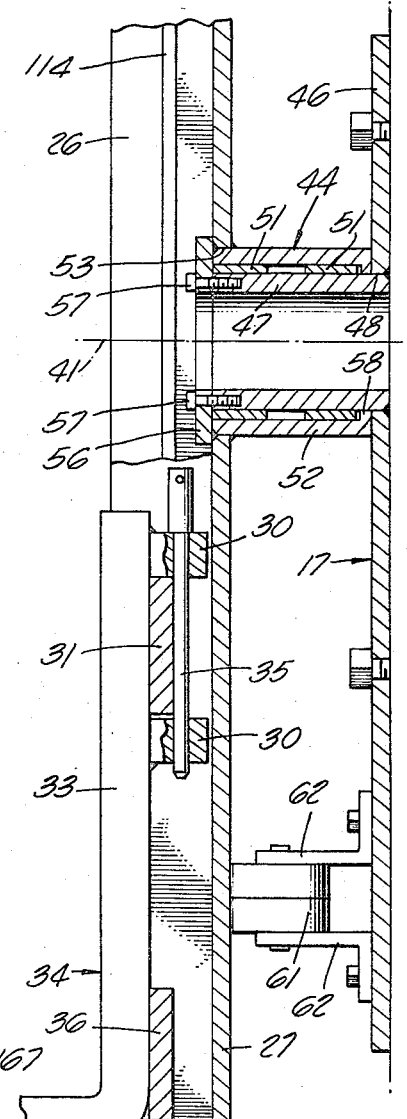
MARTIN TOMASOVICH
INVENTOR.
BY
Lathrop & West
ATTORNEYS

MARTIN TOMASOVICH
INVENTOR.

United States Patent Office

3,416,680
Patented Dec. 17, 1968

3,416,680
BIN TURNING ATTACHMENT FOR
FORK LIFT VEHICLE
Martin Tomasovich, Rte. 1, Box 26,
Live Oak, Calif. 95953
Filed Mar. 13, 1967, Ser. No. 622,806
4 Claims. (Cl. 214—307)

ABSTRACT OF THE DISCLOSURE

The disclosure comprises a framework attachable to the vertically movable carriage of a fork lift vehicle. Projecting forwardly from the framework are bin-supporting forks, the top of the bin being engaged by a vertically movable bin-clamping member enabling the bin to be inverted and the contents poured out as the framework is rotated about a fore and aft axis.

---

The invention relates to improvements in bin turning attachments for a fork lift vehicle.

The marketplace, as well as the patent literature, affords a variety of bin turners or bin dumpers.

For the most part, however, the prior devices have effected rotation of the bin supporting structure by a relatively complex array of structures including chains, sprockets, racks, pinions, gear boxes, etc. Considerable initial cost as well as upkeep has reflected this construction.

It is therefore an object of the invention to provide a bin turning attachment for fork lift vehicle which is relatively economical, and which is reliable, rugged and durable in operation.

It is another object of the invention to provide a bin turner which is readily attachable to and detachable from any commercial fork lift vehicle.

It is a further object of the invention to provide a bin turner which enables the contents to be transferred rapidly from the bin without spilling or wastage.

It is yet a further object of the invention to provide a bin turner which can safely be operated at a relatively high speed.

It is an additional object of the invention to provide a bin turning attachment wherein the bin clamping member can quickly be removed and the device made ready either for compact storage or for use as a conventional fork lift.

It is another object of the invention to provide a generally improved bin turning attachment for fork lift vehicle.

Other objects, together with the foregoing, are attained in the embodiment described in the following description, and shown in the accompanying drawings in which:

FIGURE 1 is a front elevational view illustrating the device with a bin supported thereon, the bin being shown in broken lines;

FIGURE 2 is a side elevational view thereof, showing in broken line an elevated position of the bin turning structure;

FIGURE 3 is a front elevational view, partially in section, of the bin turning mechanism in upright position of the bin, the plane of the section being indicated by the line 3—3 in FIGURE 2;

FIGURE 4 is a view comparable to FIGURE 3 but with the parts as they appear in inverted position of the bin;

FIGURE 5 is a fragmentary sectional view, to an enlarged scale, of the framework limit stip and locking structure, the plane of the section being indicated by the line 5—5 in FIGURE 3;

FIGURE 6 is a fragmentary sectional view, to an enlarged scale, of the framework cushion member, with the bin in inverted position, the plane of the section being indicated by the line 6—6 in FIGURE 4;

FIGURE 7 is a fragmentary sectional view, to an enlarged scale, of the trunnion and thrust roller mechanism, the compound planes of the section being indicated by the line 7—7 in FIGURE 3;

FIGURE 8 is a fragmentary top plan view, the plane being indicated by the line 8—8 in FIGURE 1;

Figure 9:
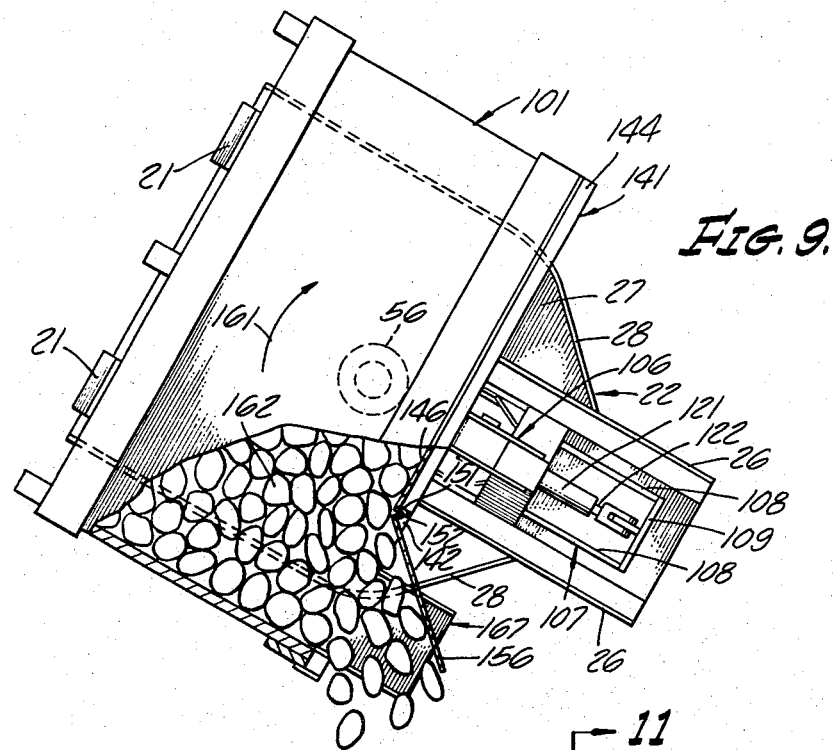
FIGURE 9 is a fragmentary front elevational view showing the bin in an inclined position with portions being broken away to reveal details of the interior of the bin and the funnel gate construction.

While the bin turner of the invention is susceptible of numerous physical embodiments, depending upon the environment and requirements of use, substantial numbers of the herein shown and described embodiment have been made, tested and used, and all have performed in an eminently satisfactory manner.

The apparatus of the invention, generally designated by the reference numeraus 16, is most conveniently mounted on the customary vertically movable carriage 17 located on the forward end of a conventional fork lift vehicle 18.

The construction and operation of the industrial lift truck 18 and the vertically movable carriage 17 do not form the subject matter of the present invention and they are therefore not described in detail, it being sufficient to say that vertical positioning of the carriage 17 is effected by a hydraulic cylinder mechanism 19 disposed between a pair of vertical channels 20 as customarily found in such vehicles. A control panel (not shown) at the operator's station enables the operator readily to control all of the mechanisms herein.

The usual forwardly extending forks ordinarily mounted on the carriage 17 are removed, pursuant to the present invention, and reappear on the present device as forks 21 mounted on and projecting forwardly from the bottom of a strong, vertical and generally planar framework 22 rotatable about a horizontal, fore and aft axis.

The framework 22 includes a spaced pair of strong, vertical strips 26, or bars, (see FIGURES 1, 2, 7 and 8) centrally mounted on a large backing plate 27 generally square in front elevation but including an upper frusto-conical portion (see FIGURE 1).

Adding beam strength to the lateral margins of the backing plate 27 is a pair of side stiffening strips 28 mounted along the margins and conforming to the shape of the backing plate 27. The margin strips 28 are secured at their upper ends to the vertical bars 26, as at locations 29.

Still further strength and rigidity is given the vertical, planar framework by a pair of transverse channels 31 (see FIGURE 1) each extending between a side strip 28 and the adjacent one of the center strips 26.

To each of the transverse channels 31 (see FIGURES 1 and 2) is removably mounted the vertical leg 33 of an L-shaped member 34, the horizontal leg of which is the corresponding fork 21 (see FIGURES 2 and 7). A pair of ears 30 on the vertical leg 33 projects over the channel 31 and is secured by a pin 35 (see FIGURE 7).

A bottom cross bar 36 spans the bottom ends of the strips 28, and with the cross bar 36 the vertical legs 33 of the L-shaped fork members are in face to face engagement. When it is desired to remove the forks 21 it is only necessary to disengage the pins 35.

The entire vertical, substantially planar framework 22 is rotatable about a generally horizontal, fore and aft axis 41 by reason of a trunnion structure shown most clearly in FIGURE 7, and designated by the reference numeral 44.

Mounted on a vertical front plate 46 secured to the carriage 17 is a horizontal sleeve 47, the after end of the sleeve being lodged within a circular opening 48 in the plate 46.

Journaled on the sleeve 47, as by interposed bearings 51 is a collar 52 welded at its base within an opening 53 in the backing plate 27 of the rotatable framework 22.

A cover plate 56 is secured to the fixed sleeve 47, as by fastenings 57, and serves to position the rotatable framework and the adjacent bearing 51 and also to confine the lubricant, such as grease, contained therein. An inturned annular lip 58 on the after end of the collar 52 provides a comparable function on the after portion of the trunnion structure 44.

As rotation of the vertical, planar framework 22 occurs, the beam strength of the trunnion 44 is assisted by a pair of rollers 61 rotatably disposed within brackets 62 mounted on the front plate 46 of the carriage 17 (see FIGURES 3, 4, 7 and 8). The rollers, in other words, resist the bending load, or moment, exerted by the weight of the framework and particularly of the bin when filled, the rollers transferring the rearward force exerted by the backing plate 27 to the front plate 46 of the carriage 17.

Rotation of the vertical, planar framework 22 is effected by a tilting mechanism, generally designated by the reference numeral 66 and illustrated most clearly in FIGURES 2, 3, 4 and 8.

With especial reference to FIGURES 3 and 4, it will be seen that on the upper, right-hand corner of the carriage front plate 46 there is mounted a substantially vertical, stationary post 71 on the upper end of which there is pivotally mounted, as by a pin 72, one end of a rocker arm 73 movable through an arc of approximately seventy degrees.

Swinging movement of the rocker arm 73 is effected by extension and retraction of a plunger 76, and a hydraulic cylinder 77, provided with suitable fluid conduits 78 and 79 extending to conventional valve controls (not shown) readily accessible to the operator, and connected to the hydraulic system on the vehicle 18. The plunger 76 is pivotally mounted on the arm 73 by a pin 75, and the lower end of the hydraulic cylinder 77 is pivotally mounted, as by a pin 81, on a flange 82 outstanding from a lateral extension 83 of the front plate 46 of the carriage 17 (see FIGURES 2–4).

Pivotally connected to the other end of the rocker arm 73, as by a pin 84, is a lever 85, adjustable as to length by threads 86. The other end of the lever 85 is pivotally mounted, as by a pin 87, carried by the backing plate 27 of the rotatable framework 22.

FIGURE 3 illustrates the attitudes of the parts in normal position with the forks in lowermost position. FIGURE 4, on the other hand, shows the attitude of the components with the framework in an inverted position.

As can be seen by particular reference to FIGURES 3 and 4, in this sequence, projection of the plunger 76 swings the rocker are 73 upwardly. Concurrently, the lever 85 is swung outwardly, thence upwardly, causing the attached rotatable framework 22 to rotate in a clockwise direction in the direction indicated by the arrow 88 (see FIGURE 4).

In order to prevent the framework 22 from rotating upwardly beyond a 180 degree swing, a limit stop 91, with a cushion 92, is provided. The limit stop 91 and the cushion 92 are mounted on the front plate 46 of the carriage 17 and are located so as to interfere with a bumper member 93 mounted on the backing plate 27 of the rotatable frame 22 (see FIGURE 6).

Reversal of rotational direction occurs as the hydraulic plunger 76 is retracted.

A lower limit stop 94 mounted on the carriage front plate 46 effectively positions the framework 22 in its normal, upright attitude. The limit stop 94 engages (see FIGURES 3 and 5) an offset flange 95 secured to the backing plate 27 when the framework 22 is in its normally upright attitude, as appears in FIGURE 3.

In the event it is desired to lock the framework in this upright position, an angle iron piece 97 (see FIGURE 5) can be inserted into the interlocking arrangement of the members and secured therto, as by a fastener 98.

As will be apparent, a bin 101, supported on the forks 21, when they are in normal, lowermost position, must be restrained against movement as the rotatable framework commences to rotate in response to the extension of the hydraulic plunger 76.

I therefore provide structure which tightly clamps the bin on the supporting forks.

Inclusive of such clamping structure, generally characterized by the reference numeral 106, is a vertically movable frame 107, or slide member, comprising a spaced vertical pair of bars 108 joined at their tops by a cross-bar 109. The bottoms of the vertical bars are affixed to the after end of a forwardly projecting, cantilevered box beam 111 of great strength.

The after portion 112 (see FIGURE 8) of the cantilevered beam 111 diverges and is secured to a transverse vertical plate 113 located between the vertical strips 26. The plate 113 (see FIGURE 8) is slidably disposed against the vertical plate 27.

A pair of vertical flanges 114 mounted on the vertical strips 26 and extending toward each other (see FIGURE 8) serves loosely to confine the outer laterally extending portions of the vertical plate 113. Lubrication, such as grease, is applied to the engaging surfaces to facilitate the vertical sliding movement of the plate member 113 as it moves along the tracks.

In order further to increase the stability of the slide member, as it slides vertically in the tracks formed by the backing plate 27, the vertical side strips 26 and the flanges 114, the bottom lateral, or corner, edges of the plate 113 have mounted thereon a pair of depending bars 116 with stiffening ribs 117 secured thereto (see FIGURE 1). The lateral edges of the depending bars 116 extend into the tracks and thus serve additionally to stabilize the vertical sliding movement of the bin clamping structure 106. A pair of triangular gussets 118 mounted on the forward surface of the depending bars 116 is welded to the bottom of the cantilevered box beam further to strengthen the root portion of the beam.

Vertical movement of the clamping structure is effected by a vertical hydraulic cylinder 121 (see FIGURE 1) pivotally mounted at its lower end on the transverse bottom plate 36. A plunger 122 projects upwardly from the cylinder 121 and is pivotally connected to the upper cross bar 109 of the slidable frame 106. Appropriate hydraulic connections 123 and 124 lead to conventional mechanism (not shown) on the vehicle.

In order to load the bin 101 on the forks 21, the clamping structure is first raised, by extending the plunger 122, so that the cantilevered beam 111 is in the approximate position shown in broken line in FIGURE 2.

The vehicle 18 is then advanced so that the forks 21 are slid under the bottom 126 of the box, the bottom 126 being slightly elevated above the ground 127 by bin legs 128, or by a suitable pallet.

With the bin 101 in its proper position, the plunger 122 is retracted downwardly, causing the cantilevered beam 111 to lower toward the top 129 of the bin.

On the forward end of the cantilevered beam there is pivotally mounted, as by a pin 130, a clevis 131, on the bottom of which is attached a fore and aft channel 132 spanning the top of the bin. Thus, when the beam 111 is fully lowered, the channel 132 comes into clamping engagement with the bin 101. Being pivoted on the pin 130, the channel 132 can rock to adapt to irregular bin tops.

At this juncture, the carriage 17 is lifted somewhat to afford clearance for the bin. The vehicle can thereupon be driven to the desired location to effect dumping of the bin's contents. Upon arriving at the destination, the carriage 17 is elevated so that the bin will be at the required height relative to the container into which the contents of the bin are to be poured.

The bin inverting mechanism is then actuated, the plunger 76 (see FIGURES 3 and 4) being projected to effect rotation if the bin in the manner previously explained.

The bin inverting mechanism will ordinarily be actuated with some degree of care when the contents are subject to being damaged. Thus, when the bin is tilted to the angle of respose of the contents, additional tilting is rather slowly effected. In this manner, the contents spill slowly and evenly out of the "downhill" side of the bin. This is especially important, as stated, where the contents are of the type which is readily bruised, such as peaches, pears, tomatoes and the like.

Where, however, the contents are not so readily damaged, for example, walnuts or almonds, or where the contents are culls which are to be discarded, dumping can much more rapidly be effected.

While the clamping structure heretofore described includes merely the rockable, fore and aft bin clamping channel 132, it is frequently desirable to meter or regulate the out-flow of the contents even more carefully than is possible with only a single fore and aft channel spanning the top of the bin.

Accordingly, as another important feature of my invention, I provide a clamping lid structure, generally designated by the reference numeral 141.

The metering or clamping lid structure 141 includes a substantially square in plan framework (see FIGURE 8) braced along three sides with angle irons 142, 143 and 144. The transverse angle irons 142 and 144 are secured to the ends of the fore and aft, clamping channel member 132 rockable on the clevis member 131.

Covering approximately two-thirds of the square in plan framework is a cover plate 146 secured to the angle irons 142, 143 and 144. A pair of lateral cover plate extensions 147 and 148 is also provided (See FIGURE 8).

The remaining portion of the lid structure is provided with flow-dividing and regulating members.

A fore and aft brace 151 extends between the transverse angle irons 142 and 144 and serves as an anchor for a pair of hinges 152 and 153 carrying a gate 156 supported, when in horizontal attitude, by a pair of small projections 158 and 159 extending toward each other from the cover plate portions 147 and 148, respectively.

With the clamping lid mounted in position, covering the top of the bin, and with the bin rotated in the direction indicated by the arrow 161 in FIGURE 9, the contents 162, such as potatoes, can be spilled out at a desired rate. The extent of flow is dependent upon the degree of inclination of the bin, the length and width of the gate 156, and the weight of the gate. In the hands of a skilled operator with some experience, the contents can be discharged at a carefully controlled, or metered, rate which could be of importance, for example, where the contents are being emptied onto a travelling conveyor whose instantaneous capacity to carry away is limited.

The gate serves still another purpose in that it channels the flow of the produce 162, and prevents random dispersion of the contents which might otherwise lead to some of the items spilling onto the ground.

The guiding effect of the gate 156 is further augmented by a pair of guide members 166 and 167 disposed on the clamping lid on opposite ends of the gate 156.

Figure 11:
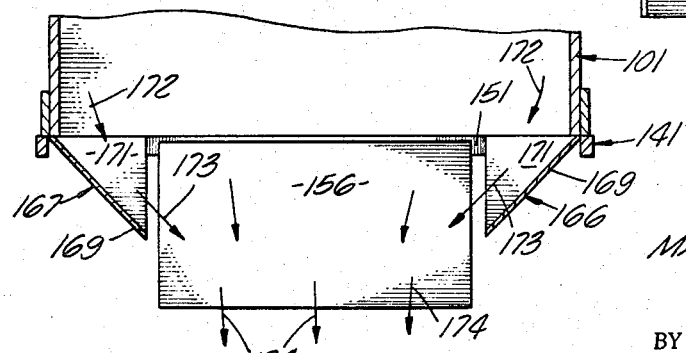

The guide members face or open toward each other and toward the gate; and each comprises an inclined plate 169 (see FIGURE 11) and a spaced pair of triangular side walls 171, the effect of the guide members being to deflect the contents toward the gate in the manner indicated by the arrows 172 and 173 so that the outflow is considerably centralized, as shown by the arrows 174 in FIGURE 11.

Figure 10:
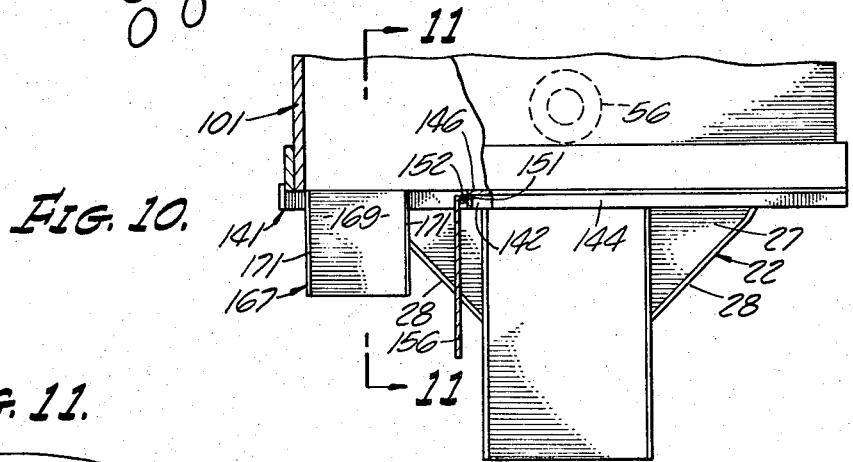
FIGURE 10 is a fragmentary front elevational view of the bin in inverted position with portions being shown in section; and, FIGURE 11 is a fragmentary sectional view of the clamping lid and gate construction, the plane of the section being indicated by the line 11—11 in FIGURE 10.

As another important feature of the guide members 166 and 167, it will be noted that the inclined deflector plates 169 both originate, at their bases, on the corner edges of the clamping lid. As a result of this placement there are no "dead" corners in the lid when the bin is in fully inverted position (see FIGURES 10 and 11). Consequently, none of the contents is able to lodge in the corners. Total discharge is thereby obtained.

At the conclusion of the emptying procedure, the bin is again righted by retracting the actuating plunger 76. The vehicle can then be driven to the bin storage area. The bin is unclamped by extending the plunger 122; and, upon reaching the storage area, the bin can be raised or lowered, to effect stacking, by suitable positioning of the carriage 17. The vehicle can then be backed away and is available to begin the next cycle of operation.

Owing to the direct action imposed upon the bin rotating structure by the plunger 76 and the linkage members 71, 73 and 85, accompanied by the buffering effect of the cushion 92, a rapid inversion of the bin can be achieved, when desired. The use of the clamping lid and the channelling effect of the gate and attendant guide members also cooperate so as to afford not only a rapid but an accurate outflow of contents. The over-all result is to provide a bin turning attachment for a fork lift vehicle which is capable of attaining all of the objects of the invention to a very effective degree.

What is claimed is:

1. In combination with a fork lift vehicle having a vertically movable carriage, a bin turner comprising:
   (a) a framework journaled on said carriage for rotation about a horizontal fore and aft axis;
   (b) forks on the bottom of said framework and projecting forwardly for supporting engagement with a bin superimposed thereon;
   (c) means slidably mounted on said framework for releasably clamping a bin against said forks;
   (d) lever means pivotally mounted on said carriage and on said framework for rotating said framework between a first upright position and a second inverted position, said lever means including a rocker arm pivotally mounted at one end on said carriage, a pivot member on said framework, and a lever pivotally mounted at a first end on the other end of said rocker arm and at a second end on said pivot member, said rocker arm being pivotally mounted on said carriage at a location above and laterally displaced in one direction from said fore and aft axis of framework rotation, said rocker arm extending laterally across and above said axis in the opposite direction; and,
   (e) hydraulic means privotally mounted on said carriage and fulcrumed on said lever means for moving said framework between said first position and said second position, said hydraulic means including a hydraulic cylinder pivotally mounted on said carriage at a location below and laterally displaced in said one direction from said axis, and a plunger pivotally mounted on said rocker arm intermediate the ends of said arm, said lever being pivotally mounted on said pivot member in said first upright position of said framework at a first location below and laterally displaced in said one direction from said axis, said lever being laterally swingable by the extension of said plunger and the upward angular movement of said rocker arm, and being thereby effective to rotate said framework about said axis, said pivot member being thereby concurrently moved to a second location above and laterally displaced in said second inverted position of said framework.

2. The device of claim 1 wherein said clamping means includes a lid member arranged to cover the top of the bin when in clamping engagement therewith.

3. The device of claim 2 wherein said lid member includes a gate hingeably mounted thereon to cover and uncover at least a portion of said lid, said gate being effective to regulate the outflow of the bin contents as said rotatable framework is moved from said first upright position toward said second inverted position.

4. The device of claim 3 including a pair of guide members located adjacent the lower corners of said lid member when the bin is inclined, each of said guide members being effective to receive and direct the adjacent contents of the bin toward the other of said guide members.

References Cited

UNITED STATES PATENTS

| | | | |
|---|---|---|---|
| 2,661,855 | 12/1953 | Jorgenson | 214—313 X |
| 3,039,631 | 6/1962 | Baker | 214—313 |
| 3,024,929 | 3/1962 | Shimmon | 214—313 |
| 3,136,437 | 6/1964 | Shimmon | 214—307 |

HUGO O. SCHULZ, *Primary Examiner.*

U.S. Cl. X.R.

214—313